Figure 1:
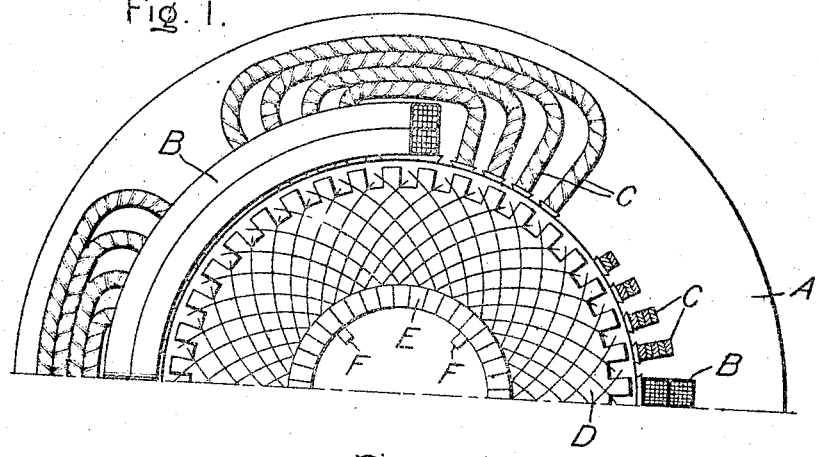

E. F. W. ALEXANDERSON.
SINGLE PHASE COMMUTATOR MOTOR.
APPLICATION FILED JAN. 7, 1908.

951,357.

Patented Mar. 8, 1910.

Witnesses:
George M. Tilden
J. Ellis Glen

Inventor:
Ernst F. W. Alexanderson,
by
Att'y.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SINGLE-PHASE COMMUTATOR-MOTOR.

951,357.  Specification of Letters Patent.   Patented Mar. 8, 1910.

Application filed January 7, 1908. Serial No. 409,699.

*To all whom it may concern:*

Be it known that I, ERNST F. W. ALEXANDERSON, a citizen of the United States, residing at Schenectady, county of Schenectady, State of New York, have invented certain new and useful Improvements in Single-Phase Commutator-Motors, of which the following is a specification.

My invention relates to single-phase motors of the commutator type having inducing and exciting windings on the stator, and while not necessarily limited to, is particularly applicable to, motors which, as disclosed in a prior patent No. 923,754, issued to me June 1, 1909, are started with the armature short-circuited, and for high speeds have a shunt voltage impressed on the armature. The purpose of impressing the voltage on the armature is to reduce the strength of the inducing field, which at low speeds assists commutation by producing in the armature coils short-circuited by the brushes an electromotive force opposing the electromotive force induced in these armature coils by the action of the exciting winding, but which at high speeds has an excessive and injurious effect on commutation, unless it is weakened in the manner above mentioned.

In addition to the electromotive forces in the armature coils short-circuited by the brushes in commutation, due to cutting the inducing field and to the transformer action of the exciting field, there is the electromotive force of commutation reactance, which becomes most serious at high speeds. If, when the shunt voltage is impressed on the armature, the exciting winding is in circuit with the inducing winding, the armature ampere turns are in excess of the ampere turns of the inducing winding, so that leakage fields are produced, and these leakage fields, when cut by the short-circuited armature coils, induce in them an electromotive force which assists the electromotive force of commutation reactance and increases its injurious effect on commutation. If the exciting winding is connected in circuit with the armature, instead of with the inducing winding, the leakage fields produced are in the proper direction for producing an electromotive force opposing that of commutation reactance, so that the commutation is improved, but the amount of these leakage fields produced by the exciting winding in the armature circuit is not always great enough wholly to neutralize the effect of commutation reactance.

In prior patents Nos. 923,754 and 923,311, issued to me June 1, 1909, I have disclosed a motor construction in which the coils of the exciting windings are placed between the stator poles, and the inducing winding is distributed over the pole-faces, and in which an armature winding is employed having a pitch corresponding to the circumferential width of the pole-faces. The use of this fractional pitch results in producing commutation of the armature coils while these coils are under the pole-tips of the stator.

My present invention consists in a motor arranged as above specified having its armature winding connected in a local closed circuit and its inducing windings so arranged that it produces a relatively excessive flux at the pole-tips. This result may be obtained by arranging the greater part of the effective ampere turns near the pole-tips. The effect of this arrangement is such that even though the total armature ampere turns may exceed the total ampere turns of the inducing winding, nevertheless, since the armature ampere turns are evenly distributed, while those of the inducing winding are somewhat concentrated near the pole-tips, the inducing winding is stronger than the armature winding at the pole-tips where commutation occurs. By means of this arrangement perfect commutation may be obtained, whether the exciting winding is connected in circuit with the inducing winding or with the armature winding.

My invention will best be understood by reference to the accompanying drawings, in which—

Figure 2:
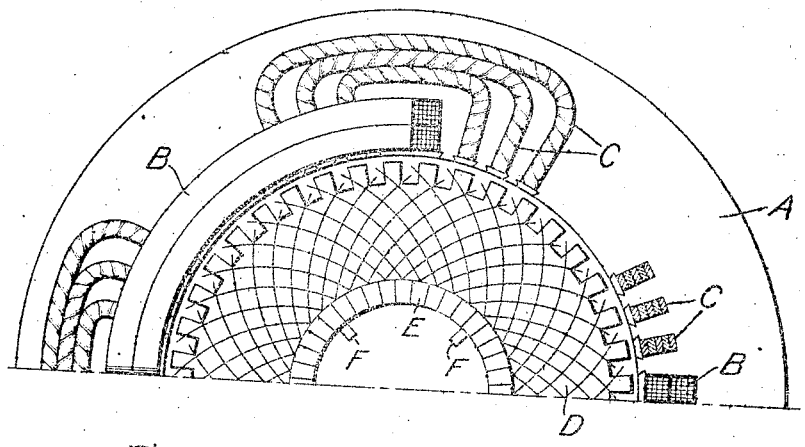
Figure 3:
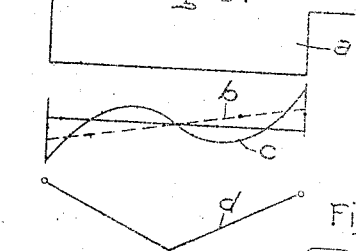
Figure 4:
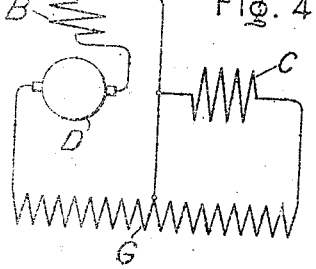
Figure 5:
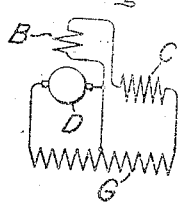

Figure 1 shows diagrammatically an end elevation, with the winding partly in cross-section, of the upper half of a motor arranged in accordance with my invention; Fig. 2 shows a modification of the same; Fig. 3 is an explanatory diagram of flux distributions; Fig. 4 is a diagram of connections with the exciting winding in the armature circuit; and Fig. 5 is a similar diagram with the exciting winding in circuit with the inducing winding.

In Fig. 1, A represents the stator, which is of the usual laminated construction, B represents the coils of the exciting winding, which are placed in large slots between the poles of the stator, and C represents the inducing winding, which is distributed in smaller slots on the pole-faces. The distribution of the ampere turns of the inducing winding is uneven, the greater portion of the turns being placed near the pole-tips, by forming the coils nearer the pole-tips with a greater number of turns, as is shown most clearly in the cross-sectional view at the right-hand side of the figure.

D represents the armature provided with the commutator E, and brushes F F. The winding of armature D is arranged with the fractional pitch approximately equal to the circumferential width of the stator pole-faces. As will be seen from this drawing, the coils undergoing commutation have their sides lying directly beneath the pole-tips of the stator.

Fig. 2 is similar to Fig. 1, except that in place of using coils having different numbers of turns, the coils of the inducing winding are crowded toward the pole-tips. While this arrangement gives a somewhat different distribution of magnetomotive force of the inducing winding from the arrangement of Fig. 1, both arrangements result in producing a relatively excessive magnetomotive force at the pole-tips.

The magnetic effect of the arrangements of Figs. 1 and 2 is shown diagrammatically in Fig. 3. In this figure $a$ represents the outline of a stator pole. The dotted line $b$ represents the resultant of the ampere turns of the inducing and armature windings, when the inducing winding is evenly distributed, and its ampere turns are somewhat in excess of those of the armature, as is the case when the exciting winding is connected in circuit with the inducing winding. The curve $c$ represents the resultant ampere turns of inducing and armature windings when the inducing winding is unevenly distributed, as shown in Figs. 1 or 2. The uneven distribution of the inducing winding causes the armature ampere turns to predominate near the center of the pole-face, but increases the predomination of the inducing ampere turns at the pole-tips; under which commutation is taking place, as indicated by the coil $d$, which represents a coil undergoing commutation. It will be seen from Fig. 3 that by the uneven distribution of the inducing winding, the field of the inducing winding at the pole-tips can be increased to any amount desired for commutation, or, if the total ampere turns of the inducing winding are less than those of the armature which, with an even distribution of the inducing winding, would reverse the slope of the dotted line $b$, producing fields at the pole-tips in the wrong direction, the field at the pole-tips can be reversed and brought into the proper direction for commutation.

Fig. 4 shows a diagram of motor connections, which would produce distributions of magnetomotive force like those shown in Fig. 3. In this figure, the exciting winding B is included in the armature circuit, so that the total inducing ampere turns are in excess of the armature ampere turns; and if the inducing winding were evenly distributed, the resultant ampere turns across the pole-faces would be as indicated by the dotted line $b$ of Fig. 3, while, if the uneven distribution of the inducing winding is adopted, the resultant ampere turns are as indicated by the curve $c$.

It is not always desirable to connect the exciting winding in circuit with the armature winding, in which case the connections of Fig. 5 might be employed. In this case the exciting winding B is in circuit with the inducing winding C, and the total armature ampere turns are then in excess of the total ampere turns of the inducing winding. Consequently, the slope of the dotted line $b$ in Fig. 3 would be reversed, if the inducing winding were evenly distributed, and the resulting field at the pole-tips would be in the wrong direction for commutation; but, by proper arrangement of the inducing winding, the distribution of ampere turns represented by the curve $c$ will still be produced, giving fields at the pole-tips of the proper direction for commutation, although near the center of the pole-face the fields will be in the opposite direction.

While I have used the term "inducing winding" to designate that winding which induces a magnetomotive force in line with that of the armature, which term is ordinarily employed to designate that winding in repulsion motors, I wish it understood that I do not by the use of that term limit my invention to repulsion motors, but that in its broader aspects my invention is equally applicable to compensated series motors, in which the winding in question is more frequently termed a compensating winding.

What I claim as new, and desire to secure by Letters Patent of the United States, is,—

1. An alternating current motor, comprising a stator, an exciting winding thereon, an inducing winding distributed in slots on the faces of the poles of the exciting winding producing a relatively excessive magnetizing effect at the pole-tips, an armature having the coils of its winding of a pitch approximately equal to the circumferential width of the pole-faces of the exciting winding, a commutator and brushes for the armature, and connections for including the armature in a local closed circuit.

2. An alternating current motor, comprising a stator, an exciting winding thereon, an inducing winding unevenly distributed in slots on the faces of the poles of the exciting winding, the greater part of its effective ampere turns being near the pole-tips, an armature having the coils of its winding of a pitch approximately equal to the circumferential width of the pole-faces of the exciting winding, a commutator and brushes for the armature, and connections for including the armature in a local closed circuit.

3. An alternating current motor, comprising a stator, an exciting winding thereon, an inducing winding distributed in slots on the faces of the poles of the exciting winding producing a relatively excessive magnetizing effect at the pole-tips, an armature having the coils of its winding of a pitch approximately equal to the circumferential width of the pole faces of the exciting winding, a commutator and brushes for the armature, connections for including the armature in a local closed circuit, and a source of shunt voltage included in said connections.

4. An alternating current motor, comprising a stator, an exciting winding thereon, an inducing winding unevenly distributed in slots on the faces of the poles of the exciting winding, the greater part of its effective ampere turns being near the pole-tips, an armature having the coils of its winding of a pitch approximately equal to the circumferential width of the pole-faces of the exciting winding, a commutator and brushes for the armature, and connections for including the armature in a local closed circuit with a source of shunt voltage.

5. An alternating current motor, comprising a stator, an exciting winding thereon, an inducing winding carried in slots on the faces of the poles of the exciting winding producing a relatively excessive magnetizing effect at the pole-tips, an armature having the coils of its winding of a pitch approximately equal to the circumferential width of the pole-faces of the exciting winding, a commutator and brushes for the armature, and connections for connecting the armature in series with the stator windings and including the armature in a local closed circuit with the source of shunt voltage.

6. An alternating current motor, comprising a stator, an exciting winding thereon, an inducing winding unevenly distributed in slots on the faces of the poles of the exciting winding, the greater part of its effective ampere turns being near the pole-tips, an armature having the coils of its winding of a pitch approximately equal to the circumferential width of the pole-faces of the exciting winding, a commutator and brushes for the armature, and connections for connecting the armature in series with the stator windings and including the armature in a local closed circuit with a source of shunt voltage.

7. An alternating current motor, comprising a stator, an exciting winding thereon, an inducing winding carried in slots on the faces of the poles of the exciting winding producing a relatively excessive magnetizing effect at the pole-tips, an armature having the coils of its winding of a pitch approximately equal to the circumferential width of the pole-faces of the exciting winding, a commutator and brushes for the armature, and connections for connecting the armature in series with the stator windings and including the armature in a local closed circuit with the exciting winding and a source of shunt voltage.

8. An alternating current motor, comprising a stator, an exciting winding thereon, an inducing winding unevenly distributed in slots on the faces of the poles of the exciting winding, the greater part of its effective ampere turns being near the pole-tips, an armature having the coils of its winding of a pitch approximately equal to the circumferential width of the pole-faces of the exciting winding, a commutator and brushes for the armature, and connections for connecting the armature in series with the stator windings and including the armature in a local closed circuit with the exciting winding and a source of shunt voltage.

In witness whereof, I have hereunto set my hand this 6th day of January, 1908.

ERNST F. W. ALEXANDERSON.

Witnesses:
BENJAMIN B. HULL,
HELEN ORFORD.